United States Patent [19]

Sun et al.

[11] Patent Number: 4,470,091

[45] Date of Patent: Sep. 4, 1984

[54] PRODUCTIVE RELAY APPARATUS FOR PROTECTION FROM SUB-SYNCHRONOUS CURRENT OSCILLATIONS IN A POWER SYSTEM

[75] Inventors: Shan C. Sun, Coral Springs, Fla.; Robert J. DelCoco, Severn, Md.

[73] Assignee: Westinghouse Electric Corp., Pittsburgh, Pa.

[21] Appl. No.: 435,441

[22] Filed: Oct. 20, 1982

[51] Int. Cl.³ .................... H02H 3/26; H02H 7/06
[52] U.S. Cl. .................................. 361/20; 361/79; 361/86; 361/111; 361/113; 340/658
[58] Field of Search .............. 361/20, 21, 79, 111, 361/113, 86, 83, 82, 78, 84, 110, 184; 324/77 E, 78 F; 322/58, 24, 25, 32; 340/658, 661; 307/129, 352, 360

[56] References Cited

U.S. PATENT DOCUMENTS

| | | | |
|---|---|---|---|
| 4,106,071 | 8/1978 | Sun et al. | 361/79 |
| 4,125,884 | 11/1978 | Sun | 361/79 |
| 4,208,687 | 6/1980 | Sun et al. | 361/20 |
| 4,218,718 | 8/1980 | Sun | 361/79 |
| 4,376,295 | 3/1983 | Venosono et al. | 361/113 X |

Primary Examiner—Patrick R. Salce
Attorney, Agent, or Firm—D. R. Lackey

[57] ABSTRACT

A protective relay for protecting a power system from sub-synchronous current oscillations. The protective relay determines both the amplitude and frequency of sub-synchronous current oscillations occurring in the power system. A series of logic relationships, based in part on the parameters of the power system, are implemented by the protective relay such that when the frequency and amplitude of the sub-synchronous oscillation signal satisfy these relationships a trip signal is produced.

18 Claims, 8 Drawing Figures

PRODUCTIVE RELAY APPARATUS FOR PROTECTION FROM SUB-SYNCHRONOUS CURRENT OSCILLATIONS IN A POWER SYSTEM

BACKGROUND OF THE INVENTION

1. Field of the Invention

The present invention relates in general to protective relays, and more specifically to protective relays for protecting electrical machines connected to an electrical power system from the harmful affects of sub-synchronous oscillations.

2. Description of the Prior Art

The existence of asynchronous oscillations, i.e., oscillations at frequencies other than the generator's normal frequency, in power systems and series-compensated transmission lines has been known for years. Asynchronous oscillations occur as a result of the resonnace of the system's capacitive and inductive components in response to transient conditions such as switching surges and fault initiation and clearing. Usually the oscillations are quickly damped by resistive losses, and do not precipitate reactions at resonant frequencies elsewhere in the system.

As the series capacitor compensation technique is increasingly employed for optimizing transmission capability of long high-voltage and extra-high-voltage lines, the expectancy that the natural or resonant frequencies of the system could and would fall below the 60 Hz synchronous frequency of the system is greatly increased. When this happens, mechanical resonance response in the generating equipment, via the stator windings, may be triggered.

Once an electrically-initiated mechanical oscillation at a resonant frequency (i.e., a modal frequency) occurs, sustained or growing sub-synchronous oscillations can be expected in a fashion similar to that of a positive feedback system. This effect can lead to eventual malfunction or destruction of the generating equipment. Turbine-generators have been severely damaged by shaft torques produced by electrically initiated mechanical system. Damaging oscillations may build slowly due to interaction between the electrical power system and the mechanical system of the turbine-generator, or a transient of high magnitude, such as due to a short circuit on series compensated transmission line, may provide a "shock" torque which initiates a sub-synchronous oscillation of the mechanical system at a resonant frequency.

Many different approaches have been used to attempt solution of the problem presented by sub-synchronous oscillations. For example, insertion of electrical power filters into the electrical line to block or dampen sub-synchronous currents has been utilized. Also, additional control has been provided for series capacitors to reduce short circuit current magnitudes. Additional control, by increasing system damping, has also been provided in the excitation system of the turbine generator. These approaches to solving the problem, however, may malfunction or fail. Such failure may, for example, be the result of filter detuning, drift of the electrical power system from the synchronous frequency, or a failure of an initiating signal to reach the series capacitor control. Obviously, since the problem is very complex, the solution may not protect the system against sub-synchronous resonance from all possible causes. Thus, it would be desirable to back-up any solution to the sub-synchronous resonance problem with a protective relay to detect an unacceptable sub-synchronous oscillation condition and either provide a trip signal for a circuit breaker to remove the apparatus to be protected from the line, or initiate some other form of corrective action.

A protective relay for such a function must distinguish between sub-synchronous oscillations which are potentially harmful and those which are not. A turbine-generator should be tripped from the line only when damage-producing oscillation thereof is imminent. Since such oscillations may be produced in a very short period of time, the processing speed of the relay must be sufficiently fast to provide the detection and corrective action before actual damage begins. The protective relay must also have a wide operating range and a sensitivity to detect 0.01 p.u. (per unit) of sub-synchronous current in the presence of a synchronous 60 Hz current of many p.u. The sub-synchronous current may also have a magnitude of many p.u.

U.S. Pat. No. 4,125,884, which patent is assigned to the same assignee of the present invention, discloses a monitoring apparatus for providing a signal responsive to the sub-synchronous current flowing in an electrical power system. The signal responsive to a current in one of the phases of a three-phase electrical power system is multiplied by a reference signal having a synchronous frequency and a constant amplitude. The product contains components having frequencies equal to: (1) twice the synchronous frequency, (2) the sum of the synchronous frequency and each sub-synchronous frequency, and (3) the difference between the synchronous frequency and each sub-synchronous frequency. A wide-band or bandpass filter passes component (3) which relates directly to sub-synchronous oscillation frequencies, while substantially blocking or attenuating components (1) and (2).

U.S. Pat. No. 4,106,071, which patent is also assigned to the same assignee as the present invention, discloses a detection apparatus for processing a signal responsive to the sub-synchronous current in an electrical power system, such as the signal (3) discussed hereinabove. This detection apparatus provides a trip signal in response to a growing oscillation in the frequency range of interest when the magnitude of the oscillation exceeds a predetermined threshold.

U.S. Pat. No. 4,208,687, which is also assigned to the same assignee as the present invention, discloses a three-phase approach to the monitoring and detection functions of a sub-synchronous current protective relay. Sequence filters develop signals related to the positive sequence component of any sub-synchronous oscillation in a three-phase electrical power system, and narrow-band filters examine the signals for oscillations at preselected frequencies known to be critical mechanical resonant frequencies of the apparatus to be protected. This patent recognizes that instead of examining only sub-synchronous oscillations growing in magnitude, that an electrical transient of a particular frequency which exceeds a predetermined magnitude may shock the mechanical system of a turbine-generator into mechanical resonance. Thus, corrective action can be taken earlier than with a protective relay which examines only growing oscillations.

U.S. Pat. No. 4,218,718, which is also assigned to the same assignee as the present invention, provides means for reducing the cost of the apparatus of U.S. Pat. No. 4,208,687 and provides certain functional advantages over this apparatus. The invention of U.S. Pat. No. 4,218,718, provides signals representative of the positive sequence component of the sub-synchronous current by multiplying each of three signals related to the three line-currents by different reference signals, each reference signal having a constant amplitude and synchronous frequency. Linear summing and wide-band filtering of the resulting products produces a signal representative of the positive sequence component of any sub-synchronous currents flowing in the associated three-phase electrical power system. The output signal of the wide-band amplifier is processed in a two-stage detection circuit responsive to the electrical transients from the line. The first stage provides an output signal when the output of the wide-band filter exceeds a first predetermined magnitude of relatively large value. The second stage operates when the first predetermined magnitude is not exceeded, but a predetermined second magnitude, smaller than the first, is exceeded. Exceeding the second magnitude initiates a pattern signal for comparison with the output of the wide-band filter. If the output of the wide-band filter exceeds the pattern signal, the second stage provides an output signal. The output signal of the wide-band filter is also processed by detection circuitry for detecting growing oscillations, and may include a narrow-band filter and detection circuitry for each frequency of interest.

SUMMARY OF THE INVENTION

Study and use of the prior art protective relays discussed above has suggested that the transient trip scheme can be improved to provide better security against ordinary 60 Hz fault transients and more protection coverage for multi-modal sub-synchronous oscillations. The multi-modal case of the most concern occurs in a system configuration where parallel lines of different series compensations are used between the turbine-generator and the load.

When a multi-modal sub-synchronous oscillation occurs, the sub-synchronous current experiences frequency beats producing constant zero-crossing drifts. The zero crossing information is the only means available for fast determination of the sub-synchronous current frequency. The amount of drift, of course, depends on the sub-synchronous frequencies and their relative magnitudes. The frequency determining scheme in the prior art protective relays discussed above is neither adequate nor fast enough to provide detection for some complex multi-modal occurrences.

The present invention describes an improved frequency detection scheme which, in conjunction with a new logic scheme, provides protection for nearly all conceivable multi-modal sub-synchronous oscillation cases. Furthermore, the present invention includes additional features to provide enhanced security against ordinary 60 Hz fault initiation and clearing transients.

Accordingly, a protective relay for protecting a power system from sub-synchronous oscillations is disclosed. The protective relay is coupled to the power system for producing a sub-synchronous signal representative of the sub-synchronous current in the power system. A reference signal, produced in the protective relay, is compared with the sub-synchronous signal and a guard crossing pulse produced when the sub-synchronous signal exceeds the reference signal. The protective relay also determines the frequency of the sub-synchronous signal and produces a correct frequency pulse when this frequency is within a predetermined range.

The guard crossing pulse and the correct frequency pulse are compared in a complex multi-stage logic unit implementing a unique set of logical relationships. If the proper relationship exists between the guard crossing pulse and the correct frequency pulse, a trip signal is produced.

Alternatively, if a sub-synchronous signal of sufficient amplitude is produced, the preceding circuitry is bypassed and a trip signal produced immediately. These and other advantages of the present invention are discussed below in the description of the preferred embodiments.

BRIEF DESCRIPTION OF THE DRAWINGS

The present invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

Figure 1:
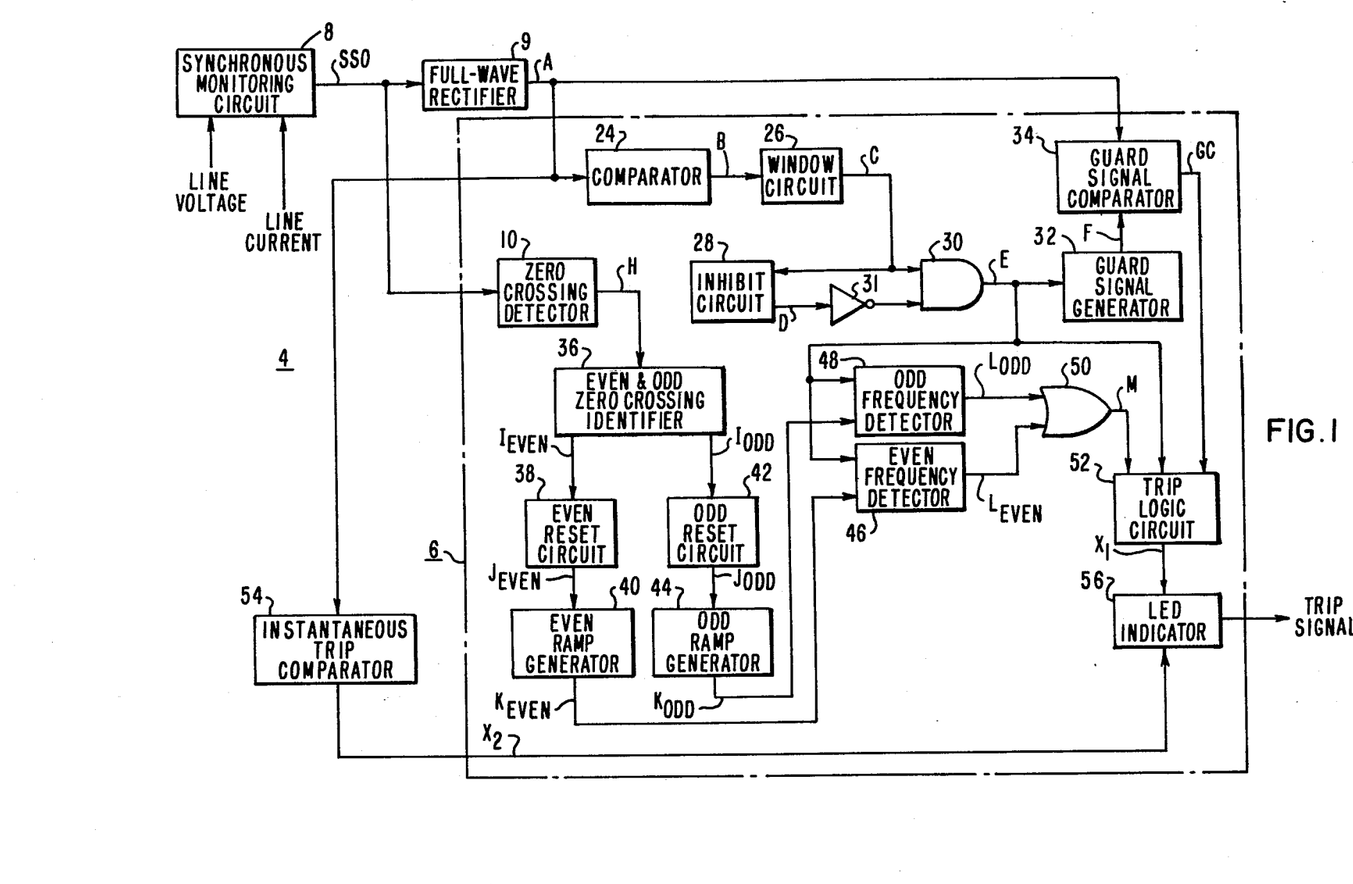
FIG. 1 is a block diagram of a sub-synchronous-oscillations protective relay constructed according to the teachings of the present invention.

FIG. 1 illustrates a sub-synchronous-oscillations protective relay 4 constructed according to the teachings of the present invention for providing protection from sub-synchronous current oscillations. The sub-synchronous-oscillations protective relay 6 includes a synchronous monitoring circuit 8, a full-wave rectifier 9, a protective relay module 6, and an instantaneous trip comparator 54. The protective relay module 6 provides a mid-range transient trip evaluation, while the instantaneous trip comparator 54 provides an instantaneous trip evaluation. The protective relay module 6 is designed to be sensitive to only a single sub-synchronous modal or resonant frequency of the equipment being protected. If the equipment has more than one modal frequency, a protective relay module identical to the protective relay module 6, except for the response frequency, must be provided for each modal frequency. The synchronous monitoring circuit 8 is responsive to the 60 Hz line voltage and line current from the power system (not shown in FIG. 1). The synchronous monitoring circuit 8 produces a signal SSO representative of the sub-synchronous current in the power system. Signal SSO is input to the full-wave rectifier 9 and a zero-crossing detector 10.

Figure 2:
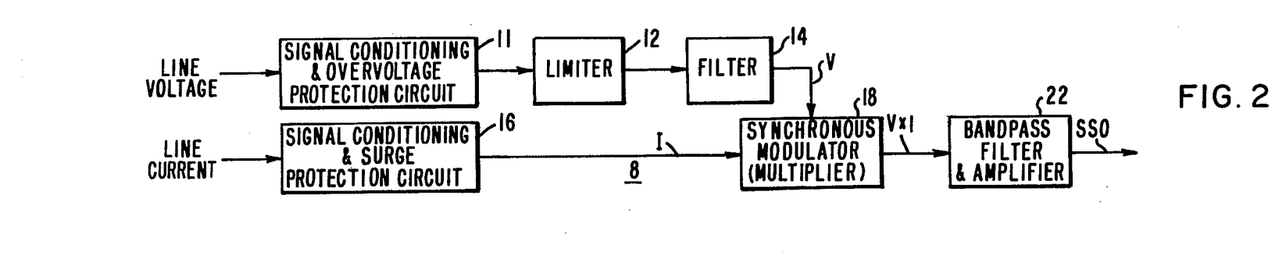
FIG. 2 is a block diagram of the synchronous monitoring circuit shown in FIG. 1.

Before discussing the full-wave rectifier 9 and the zero-crossing detector 10 in detail, it is instructive to consider the synchronous monitoring circuit 8 in more depth. Turning to FIG. 2, there is shown a block diagram of the synchronous monitoring circuit 8. Signal SSO produced by the synchronous monitoring circuit 8 is developed in accordance with the teachings set forth in U.S. Pat. No. 4,125,884, which is assigned to the assignee of the present invention. The disclosure therein is hereby incorporated by reference, and for details in excess of those included in the following description reference should be made to that patent.

In FIG. 2, the line voltage, in which asynchronous components are of very low magnitude compared to the 60 Hz voltage, is used as a reference input to the synchronous monitoring circuit 8. The line voltage is reduced to a workable level compatible with the components used to implement the functions of the synchronous monitoring circuit 8 by a step-down transformer or a suitable voltage divider (neither shown in FIG. 2). A signal conditioning and over-voltage protection circuit 11 is responsive to the line voltage. The signal conditioning and over-voltage protection circuit 11 removes high-frequency noise and provides proper over-voltage protection for the synchronous monitoring circuit 8. An input terminal of a limiter 12 is connected to an output terminal of the signal conditioning and overvoltage protection circuit 11. The limiter 12 transforms the sinusoidal line voltage into a square-wave voltage of the same frequency, but with a well-defined amplitude. This transformation is achieved by high gain amplification and precise amplitude limiting. A filter 14 receives an input signal from the limiter 12 for removing the harmonic components of the square wave, thereby producing a constant amplitude, 60 Hz sinusoidal signal V which is insensitive to line voltage fluctuations.

The line current signal, containing the sub-synchronous components, is acquired via a current-transformer shunt circuit or other equivalent means (not shown in FIG. 2). The line current signal is input to a signal conditioning and surge protection circuit 16. The signal conditioning and surge protection circuit 16 is similar to the signal conditioning and over-voltage protection circuit 11 in that the former also suppresses high frequency noise. Also, the signal conditioning and surge protection circuit 16 provides current surge protection for the synchronous monitoring circuit 8. An output signal from the signal conditioning and surge protection circuit 16 is designated I in FIG. 2.

Voltage signal V and current signal I are input to a synchronous modulator (multiplier) 18. The synchronous modulator 18 performs multiplication on the signals input thereto, the results of which are explained mathematically below. Assume that the signals V and I are represented mathematically as follows:

$$V = V_p \sin \omega_0 t \text{ and} \quad (1)$$

$$I = I_p \sin(\omega_0 t + \theta) + I_s \sin \omega_s t; \quad (2)$$

where $V_p$ and $I_p$ are the peak values of the line voltage and current at normal line frequency ($\omega_0$), and $\omega_0$ = normal 60 Hz line frequency expressed in rad./sec., $\omega_s$ = sub-synchronous frequency expressed in rad./sec., $I_s$ = peak value of sub-synchronous current, and $\theta$ = phase angle between line voltage and current at normal line frequency.

Thus, the signal obtained at the output of the synchronous modulator circuit 18 is:

$$V \times I = (V_p I_p / 2)[\cos \theta - \cos(2\omega_0 t + \theta)] + (V_p I_s / 2)[\cos(\omega_0 - \omega_s)t - \cos(\omega_0 + \omega_s)t] \quad (3)$$

It is evident from inspection of equation (3) that the function of the synchronous modulator 18 is to eliminate the $\omega_0$ frequency term. Thus, in performing multiplication of the signals I and V, the synchronous modulator 18 produces the double frequency term $2\omega_0$ and two beat frequency terms $(\omega_0 - \omega_s)$ and $(\omega_0 + \omega_s)$. The frequency separation between the double frequency term $2\omega_0$ and the beat frequency term $(\omega_0 - \omega_s)$ is much greater than the frequency difference between $\omega_0$ and $\omega_s$. Consequently, the filter design for separating $\omega_0 - \omega_s$ from $2\omega_0$ is easier to implement than the design for separating $\omega_s$ from $\omega_0$.

The product $V \times I$ is input to a bandpass filter and amplifier 22. The bandpass filter and amplifier 22 attenuates the beat frequency term $(\omega_0 + \omega_s)$ and the $2\omega_0$ term. Note that the $(\omega_0 + \omega_s)$ frequency is between the frequencies $2\omega_0$ and $(\omega_0 - \omega_s)$; the amplitude of the $(\omega_0 + \omega_s)$ term is identical to the amplitude of the $(\omega_0 - \omega_s)$ term. In practice, the phase angle $\theta$ is either a fixed term or one which varies slowly.

Although the beat frequency term $(\omega_0 - \omega_s)$ does not suggest the value of the frequency $\omega_s$ directly, the value of $\omega_s$ can be identified exactly since the frequency $\omega_o$ is known. Furthermore, since $V_p$ is a constant, the term $(V_p I_s)$ follows the amplitude behavior of the sub-synchronous component precisely. Thus, the bandpass filter and amplifier 22 is easily implemented to provide, at an output terminal thereof, signal SSO.

As an alternative approach, the term $I_p \sin(\omega_0 t + \theta)$ in equation (2) can be removed, leaving only the sub-synchronous oscillation components, by processing the signal through an appropriately designed filter. Such an approach, however, has serious drawbacks. Most important is the delay inherent in such a filter which might prevent timely corrective action by the protective relay module 6 to the sub-synchronous oscillations. In addition, the use of such a filter would add unnecessarily to the cost and complexity of the final design.

Returning to FIG. 1, signal SSO produced by the synchronous monitoring circuit 8 is input to the precision full-wave rectifier 9. Signal A produced by the full-wave rectifier 9 is a full-wave rectified version of signal SSO. Signal A is used to determine two trip conditions; the mid-range transient trip condition in the protective relay module 6, and the instantaneous trip condition in the instantaneous trip comparator 54. Signal A is input to a comparator 24. The comparator produces a signal B having high and low states. Signal B is in the high state only when signal A exceeds a predetermined value of 0.16 P.U. Signal B is input to a window circuit 26 for producing a signal C also having high and low states. Each leading edge of signal B triggers signal C to the high state; signal C stays in the high state for 60 ms. If signal C is in the high state when a leading edge of signal B occurs, signal C is extended to remain high for 60 ms from the time of retriggering. Signal C is input to an inhibit circuit 28 and to a first terminal of an AND gate 30. The inhibit circuit 28 produces a signal D having high and low states. At the leading edge of signal C, signal D goes to the high state and remains in the high state for 100 ms. Signal D is retriggered by each leading edge of signal C occurring while signal D is in the high state to remain in the high state for 100 ms from the time of such a retriggering. Signal D is input to an inverting gate 31, the output signal of which is input to a second input terminal of the AND gate 30. The AND gate 30 produces a signal E having high and low states. Signal E is in the high state only when signal C is high and signal D is low. Signal E is input to a guard signal generator 32 for producing a signal F. A first input terminal of a guard signal comparator 34 is responsive to signal F, and a second input terminal thereof is responsive to signal A. Signal F has a constant amplitude when signal E is in the low state, but at the leading edge of signal E, signal F is triggered to the high state and begins to decay exponentially with a time constant dependent on the resonant frequencies of the equipment being protected by the sub-synchronous-oscillations protective relay 4. When signal E is in the high state, the guard signal comparator 34 compares signal F with signal A and produces a guard crossing pulse (designated GC in FIG. 3) when the instantaneous value of signal A exceeds signal F. Guard crossing pulses indicate a sub-synchronous signal of sufficient amplitude to cause sub-synchronous-oscillations in the equipment protected by the sub-synchronous-oscillations protective relay 4. Frequency evaluation of the guard crossing pulses will be discussed subsequently.

Figure 4:
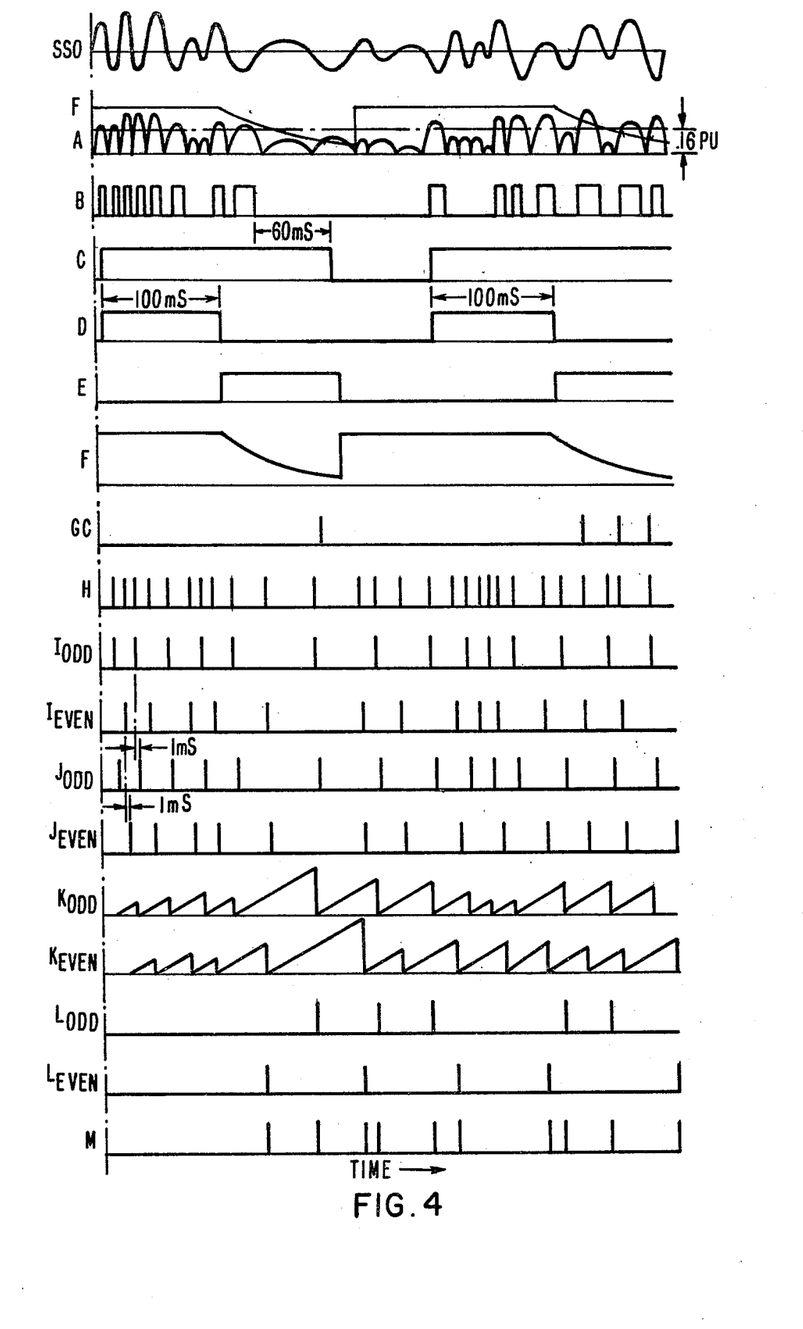
FIGS. 4, 5, and 6 are timing diagrams illustrating operation of the present invention.

To better understand the operation of the protective relay module 6 as discussed hereinabove, reference should be made to the FIG. 4 timing diagram. Signals SSO and A are shown at the top of FIG. 4. Note that signal A is a full-wave rectified version of signal SSO. Signal B consists of a series of pulses occurring when signal A exceeds 0.16 p.u. Signal C is triggered high by the leading edge of each pulse of signal B. Signal C has a duration of 60 ms and is retriggered by each leading edge of signal B (even if signal C is in the high state when the leading edge of signal B occurs). The time during which signal C is in the high state is defined as an event, and it is during an event that signal A is compared with signal F. This comparison process is, however, inhibited during the high state of signal D. Although the high state of signal D is shown as having the duration of 100 ms in FIG. 4 in one embodiment of the present invention, it is in fact adjustable over a range of 40–100 ms. The inhibit feature is necessary to reduce the possibility of false tripping of the sub-synchronous-oscillations protective relay 4 during ordinary 60 Hz (i.e., normal power line frequency) fault initiation and clearing transients. When signal D goes low, signal E is triggered high and signal F begins to decay exponentially. Note that signal F is illustrated below signal E and is also super-imposed over signal A for ease in comparison therewith. Guard crossing pulses (GC) are produced whenever signal A exceeds signal F. Signal E, serving as a master control for the protective relay module 6, is high during the time signal F is compared with signal A and low at all other times.

Returning to FIG. 1, signal SSO is also input to the zero-crossing detector 10. The zero-crossing detector 10 produces a signal H consisting of a series of pulses, wherein a short pulse is produced each time signal SSO crosses the zero amplitude axis. The signal H is input to an even and odd zero-crossing identifier 36. The even and odd zero-crossing identifier 36 produces a signal $I_{ODD}$ consisting of a series of short pulses occurring at each odd-numbered crossing of the zero axis by signal SSO. The even and odd zero-crossing identifier 36 also produces a signal $I_{EVEN}$ consisting of a series of short pulses for each even-numbered zero-crossing of signal SSO. The signal $I_{EVEN}$ is input to an even reset circuit 38 wherein a signal $J_{EVEN}$ is produced. Signal $J_{EVEN}$ consists of a series of pulses lagging the pulses of the signal $I_{EVEN}$ by 1 ms. Signal $J_{EVEN}$ is input to an even ramp generator 40 wherein a linearly-increasing voltage ramp is produced. When a pulse of signal $J_{EVEN}$ is received by the even ramp generator 40, the voltage ramp is reset to zero after which the voltage ramp begins to increase again. The ramp signal is designated $K_{EVEN}$ in FIG. 1.

Similarly, signal $I_{ODD}$ is input to an odd reset circuit 42 for producing a signal $J_{ODD}$. The pulses of signal $J_{ODD}$ lag the pulses of signal $I_{ODD}$ by 1 ms. Signal $J_{ODD}$ is input to an odd ramp generator 44 for producing a signal $K_{ODD}$. Signal $K_{ODD}$ consists of a series of linearly increasing voltage ramps which are reset to zero when the odd ramp generator 44 receives a pulse of signal $J_{ODD}$. Note that the ramp voltages of signals $K_{EVEN}$ and $K_{ODD}$, at a point prior to being reset to zero, are representative of the pulse frequency of signals $I_{EVEN}$ and $I_{ODD}$, respectively.

$K_{EVEN}$ is input to a first terminal of an even frequency detector 46. A second terminal of the even frequency detector 46 is responsive to signal E. The even frequency detector 46 samples the ramp voltage of signal $K_{EVEN}$ and if the voltage, which is directly proportional to the frequency of the signal $I_{EVEN}$, lies within a given range of the sub-synchronous resonant frequency of the protected equipment, an output pulse of a signal $L_{EVEN}$ is produced. An odd frequency detector 48 is responsive to signal $K_{ODD}$ at a first terminal thereof and to signal E at a second terminal thereof. The odd frequency detector 48 samples the ramp voltage of the signal $K_{ODD}$ and if the ramp voltage, which is directly proportional to the frequency of signal $I_{ODD}$, lies within the predetermined range of the sub-synchronous resonant frequency of the protected equipment, an output pulse of a signal $L_{ODD}$ is produced. Signal E resets the even frequency detector 46 and the odd frequency detector 48 at the end of an event.

Signals $L_{EVEN}$ and $L_{ODD}$ are input to an OR gate 50. The OR gate 50 produces correct frequency pulses (designated M in FIG. 3). Signals E, GC, and M are input to a trip logic circuit 52 wherein a determination is made regarding whether a trip condition exists. If a trip condition exists, the trip logic circuit 52 produces a signal $X_1$. Details of the trip logic circuit 52 are discussed in conjunction with FIG. 3.

In essence, the zero-crossing detector 10 and the elements of the protective relay module 6 operating in conjunction therewith, monitor one full cycle of signal SSO every half cycle. That is, every half cycle of the sub-synchronous oscillation signal an output pulse (i.e., signal M) is produced if the previous full cycle was of the correct frequency.

Returning to FIG. 4, there is also shown timing diagrams of the signals H through M discussed in conjunction with FIG. 1. A pulse of signal H is produced whenever signal SSO crosses the zero-amplitude axis. Odd-numbered pulses of signal H appear in signal $I_{ODD}$; while even-numbered pulses of signal H appear in signal $I_{EVEN}$. The pulses of signals $J_{ODD}$ and $J_{EVEN}$ lag the pulses of signals $I_{ODD}$ and $I_{EVEN}$, respectively, by 1 ms. Each pulse of signal $J_{ODD}$ resets the ramp voltage of signal $K_{ODD}$. Likewise, each pulse of signal $J_{EVEN}$ resets the ramp voltage of signal $K_{EVEN}$. Signals $L_{ODD}$ and $L_{EVEN}$ are produced by the odd frequency detector 48 and the even frequency detector 46, respectively, when the ramp voltages of signals $K_{ODD}$ or $K_{EVEN}$ are of the proper amplitude. (Thereby indicating that the frequency of signal SSO is within a predetermined range of a modal frequency of the equipment protected by the protective relay module 6.) Lastly, correct frequency pulses (M) representing the logical sum of signals $L_{ODD}$ and $L_{EVEN}$ are shown on the bottom line of FIG. 4.

Returning once again to FIG. 1, the instantaneous trip comparator 54 is responsive to signal A. In the instantaneous trip comparator 54, signal A is compared to a predetermined selectable value. One embodiment of the present invention uses the following four values: 1.0, 1.25, 1.5, and 1.75 p.u. If signal A exceeds a selected value, a signal $X_2$ is produced. Signal $X_2$ is input to an LED indicator 56 at a first terminal thereof. The second terminal of the LED indicator 56 is responsive to signal $X_1$. The LED indicator indicates when a trip condition exists, based on the status of signals $X_1$ and $X_2$, and produces a trip signal to a circuit breaker (not shown in FIG. 1).

Figure 3:
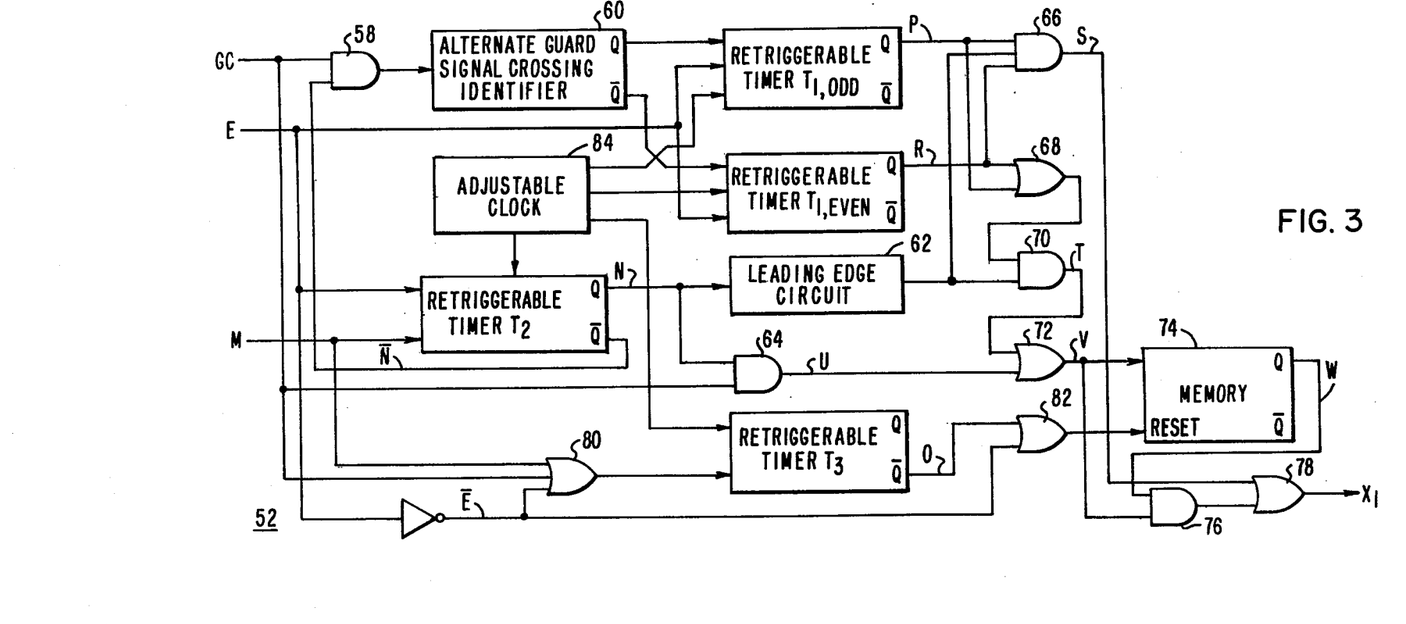
FIG. 3 is a block diagram of the trip logic circuit shown in FIG. 1.

Before discussing the trip logic circuit 52, shown in detail in FIG. 3, it is helpful to understand the relationships between signal E, the guard crossing pulses (GC), and the correct frequency pulses (M) causing the trip logic circuit 52 to produce signal $X_1$. The logic of the trip logic circuit 52 should provide the following:
1. A guard crossing pulse (GC) is considered valid if:
   A. The guard crossing pulse occurred within a fixed time $T_1$ before a correct frequency pulse, or
   B. The guard crossing pulse occurred within a fixed time $T_2$ after a correct frequency pulse.
2. If two valid guard crossing pulses are detected before the trip logic circuit 52 is reset, signal $X_1$ goes high.
3. The trip logic circuit 52 resets if for two cycles of the modal frequency ($T_3$), there are no guard crossing pulses nor correct frequency pulses.
4. The trip logic circuit 52 resets at the trailing edge of each pulse of signal E.
5. Signal E goes to the low state only when the magnitude of signal SSO falls below approximately 0.16 p.u.

Turning now to FIG. 3, there is shown the elements of the trip logic circuit 52. Signal M (correct frequency pulses) is input to a retriggerable timer $T_2$. Each correct frequency pulse retriggers the retriggerable timer $T_2$ to a high state for a period $T_2$. A signal N is produced by the retriggerable timer $T_2$ at an output terminal Q thereof. The signal N and the other signals identified on FIG. 3 will also be discussed in conjunction with the timing diagrams of FIGS. 5 and 6. A signal $\overline{N}$ is produced at an output terminal $\overline{Q}$ of the retriggerable timer $T_2$. Signal $\overline{N}$, bearing an inverse relationship to signal N, is input to a first terminal of an AND gate 58. Signal GC (guard crossing pulses) is input to a second terminal of the AND gate 58.

An output terminal of the AND gate 58 is connected to an input terminal of an alternate guard signal crossing identifier 60. The alternate guard signal crossing identifier 60 counts each pulse received from the AND gate 58. This count is reflected at output terminals Q and $\overline{Q}$ of the alternate guard signal crossing identifier 60. The output terminal Q of the alternate guard signal crossing identifier 60 is connected to a first input terminal of a retriggerable timer $T_{1,ODD}$. At an output terminal Q of the retriggerable timer $T_{1,ODD}$ a signal P is produced. Signal P consists of a series of pulses of duration $T_1$, wherein $T_1$ is measured from the leading edge of each odd guard crossing pulse occurring when the output terminal $\overline{Q}$ of the retriggerable timer $T_2$ is high. An output terminal $\overline{Q}$ of the alternate guard signal crossing identifier 60 is connected to a first input terminal of a retriggerable timer $T_{1,EVEN}$. A signal R is produced at an output terminal Q of the retriggerable timer $T_{1,EVEN}$. Signal R consists of a series of pulses of duration $T_1$, wherein $T_1$ is measured from the leading edge of each even guard crossing pulse occurring when the output terminal $\overline{Q}$ of the retriggerable timer $T_2$ is high.

Signal N is input to a leading edge circuit 62 for producing a short pulse at the leading edge of each pulse of signal N. A first input terminal of an AND gate 66 is responsive to signal P; a second input terminal of AND gate 66 is responsive to signal R. A third input terminal of the AND gate 66 is connected to an output terminal of the leading edge circuit 62. A signal S is produced at an output terminal of the AND gate 66 when each of the input signals thereto is in a high state. That is, a correct frequency cycle is detected (i.e., the output terminal Q of the retriggerable timer $T_2$ is high) when signals P and R are high, signal S is high. The high state of signal S signifies that two guard crossings have been detected and the frequency of signal SSO has been determined to be correct (i.e., a correct frequency pulse has occurred), all within the window time $T_1$.

A first input terminal of an OR gate 68 is responsive to signal R; a second input terminal of the OR gate 68 is responsive to signal P. A first input terminal of an AND gate 70 is connected to an output terminal of the OR gate 68. A second input terminal of the AND gate 70 is connected to the output terminal of the leading edge circuit 62. A signal T appears at an output terminal of the AND gate 70. Signal N is input to a first input terminal of an AND gate 64; a second input terminal of the AND gate 64 is responsive to signal GC. AND gate 64 produces a signal U. A first input terminal of an OR gate 72 is responsive to signal U. A second input terminal of the OR gate 72 is responsive to signal T. A signal V appears at an output terminal of the OR gate 72. The OR gates 68 and 72 and the AND gates 64 and 70 function to detect when either (but not both) signal P or signal R is in the high state, signifying that a valid guard crossing occurred within time $T_1$ before a correct frequency detection. A pulse of signal V is produced when this condition is satisfied. Such a vaid guard crossing must be counted, because if two such valid guard crossing occur before the trip logic circuit 52 is reset, the signal $X_1$ should be produced.

A first input terminal of a memory 74 is responsive to signal V for counting each pulse thereof. The leading edge of each pulse of signal V causes an output terminal Q of the memory 74 to go high. A signal W appears at the output terminal Q of the memory 74. A first input terminal of an AND gate 76 is responsive to signal W; a second input terminal of the AND gate 76 is responsive to signal V. A first input terminal of an OR gate 78 is responsive to signal S. A second input terminal of the OR gate 78 is connected to an output terminal of the AND gate 76. When signal W is in a high state (indicating that a guard crossing pulse has occurred within $T_1$ before a correct frequency detection pulse) and signal V is high (indicating that a second guard crossing pulse has occurred within $T_1$ before a correct frequency detection pulse) the output terminal of the AND gate 76 is high thereby producing signal $X_1$. Note also that when signal S is high, signal $X_1$ is produced via the OR gate 78.

OR gates 80 and 82 and a retriggerable timer $T_3$, reset the memory 74. A first input terminal of the OR gate 80 is responsive to signal M; a second input terminal of the OR gate 80 is responsive to signal GC. Signal E is input to an inverting gate 81 for producing a signal $\overline{E}$. A third input terminal of the OR gate 80 is responsive to signal $\overline{E}$. A first input terminal of the retriggerable timer $T_3$ is connected to an output terminal of the OR gate 80. An output terminal $\overline{Q}$ of the retriggerable timer $T_3$ is connected to a first input terminal of the OR gate 82. A second input terminal of the OR gate 82 is responsive to signal $\overline{E}$. An output terminal of the OR gate 82 is connected to a reset input terminal of the memory 74 for resetting thereof.

The leading edge of each pulse from the OR gate 80 retriggers the retriggerable timer $T_3$ for a period $T_3$. When the retriggerable timer $T_3$ is retriggered, the output terminal $\overline{Q}$ goes to a low state thereby keeping the memory 74 active. At the end of the period $T_3$ the output terminal $\overline{Q}$ goes high and the memory 74 is reset. The memory 74 is also reset when signal E goes low, causing signal $\overline{E}$ to go high.

A first output terminal of an adjustable clock 84 is connected to a second input terminal of the retriggerable timer $T_{1,ODD}$; a second output terminal of the adjustable clock 84 is connected to a second input terminal of the retriggerable timer $T_{1,EVEN}$; a third output terminal of the adjustable clock 84 is connected to a second input terminal of the retriggerable timer $T_2$; a fourth output terminal of the adjustable clock 84 is connected to a second input terminal of the retriggerable timer $T_3$. The adjustable clock 84 provides proper timing signals to the retriggerable timers $T_{1,ODD}$, $T_{1,EVEN}$, $T_2$, and $T_3$. In one embodiment of the present invention, $T_{1,ODD}=T_{1,EVEN}=T_2=T_3=$approximately two cycles of the modal frequency. Shared usage of the adjustable clock 84 significantly reduces the complexity of the hardware design.

Figure 5:
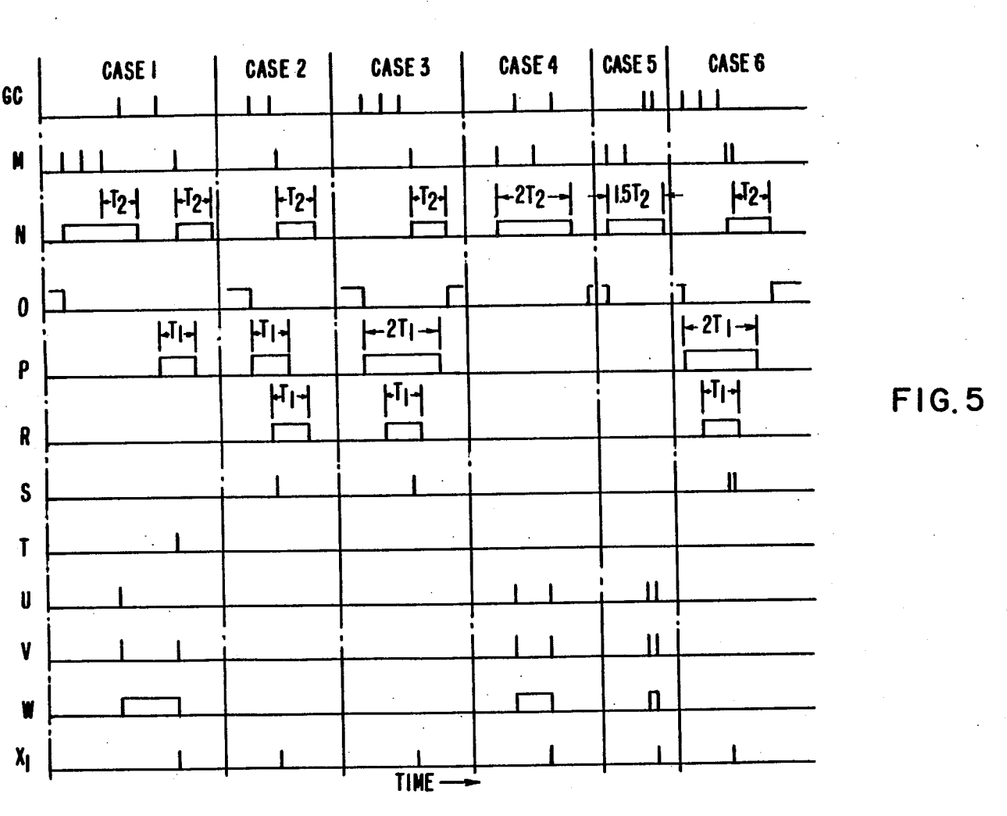

To better understand the function of the trip logic circuit 52, FIG. 5 illustrates several case studies wherein signal $X_1$ is produced, assuming various configurations for the signals GC, M, and E. Ultimately, signal $X_1$ causes the trip signal to be produced via the LED indicator 56 shown in FIG. 1. Reference should also be made to FIG. 3 to aid in understanding the timing diagrams of FIG. 5.

In case 1, multiple correct frequency pulses (signal M) set the retriggerable timer $T_2$ high, i.e., signal N. Note that each correct frequency pulse retriggers the retriggerable timer $T_2$ for a period $T_2$. A guard crossing pulse occurs while signal N is high thereby producing a pulse in signal U at the output terminal of the AND gate 64. Signal U causes signal V to go high setting the memory 74. When the memory 74 is set, signal W goes to the high state to remember a first guard crossing pulse. A second guard crossing pulse occurs when signal N has gone to the low state, therefore signal U does not go high. The second guard crossing pulse, however, sets the retriggerable timer $T_{1,ODD}$ to a high state causing signal P to go high for a period $T_1$. A correct frequency pulse occurs while signal P is high setting the retriggerable timer $T_2$ high and causing signal N to go high. This causes signals T and V to go high. Since signal W is high, the output terminal of the AND gate 76 is high and therefore signal $X_1$ goes high. Case 1 illustrates the detection of a valid guard crossing pulse and the ability of the protective relay module 6 to look forward and backward in time to evaluate the validity of a guard crossing. Note that in case 1, two valid guard crossing pulses were detected and therefore signal $X_1$ went high. The first valid guard crossing pulse occurred within $T_2$ after a correct frequency pulse, and the second valid guard crossing pulse occurred within $T_1$ before a correct frequency pulse.

In case 2 two guard crossing pulses occur. The first guard crossing pulse sets the retriggerable timer $T_{1,ODD}$ high and the second sets the retriggerable timer $T_{1,EVEN}$ high. A correct frequency pulse then causes signal N to go high. When signal N goes high, the leading edge circuit 62 produces a leading edge pulse which is input to the AND gate 66. Since signals P and R are high, signal S goes high. Signal S causes signal $X_1$ to go high via the OR gate 78. Case 2 illustrates the need for two retriggerable timers (i.e., $T_{1,ODD}$ and $T_{1,EVEN}$) to evaluate the validity of multiple guard crossings occurring within a period $T_1$ before a correct frequency pulse.

Three guard crossing pulses occur in case 3. The first guard crossing pulse causes signal P to go high; the second guard crossing pulse causes signal R to go high; the third guard crossing pulse retriggers signal P to the high state. A correct frequency pulse occurs while both signals P and R are high thereby producing signal $X_1$ as in case 2. This case illustrates the use of retriggering of the retriggerable timers $T_{1,ODD}$ and $T_{1,EVEN}$ to prolong the desired window time.

In case 4, a correct frequency pulse causes signal N to go high. A guard crossing pulse occurs while signal N is high causing signals U and V to go high and setting the memory 74. Signal W is now in the high state. Note that the guard crossing pulse is blocked from the alternate guard signal crossing identifier 60 (by the low state of the $\overline{Q}$ output terminal of the retriggerable timer $T_2$) because the guard crossing pulse has been memorized in the memory 74 and should therefore not be further evaluated. A second guard crossing pulse occurs while signal N is high. The second guard crossing pulse causes signals U and U to go high, thereby placing a high signal at the second input terminal of the AND gate 76. Since signal W is high, the output terminal of the AND gate 76 is high causing signal $X_1$ to go high.

A correct frequency pulse causes signal N to go to a high state in case 5. Then a second correct frequency pulse retriggers signal N to the high state. While signal N is high, two guard crossing pulses occur. As discussed in conjunction with case 4, the first guard crossing pulse causes signal W to go high and the second guard crossing pulse enables the AND gate 76 thereby causing signal $X_1$ to go high.

In case 6, three guard crossing pulses occur while signal N is low. The first and third guard crossing pulses trigger (and retrigger) the retriggerable timer $T_{1,ODD}$ causing the signal P to go to the high state. The second guard crossing pulse causes the signal R to go to the high state. Two correct frequency pulses then occur while signals P and R are high. The first such correct frequency pulse causes signal S to go high thereby causing signal $X_1$ to go high via the OR gate 78.

In all six cases above, the $\overline{Q}$ output terminal of the retriggerable timer $T_3$ (signal O) is set low by the first guard crossing pulse or correct frequency pulse and remains low during the entire case. Also, signal E is low during the entire case.

Figure 6:
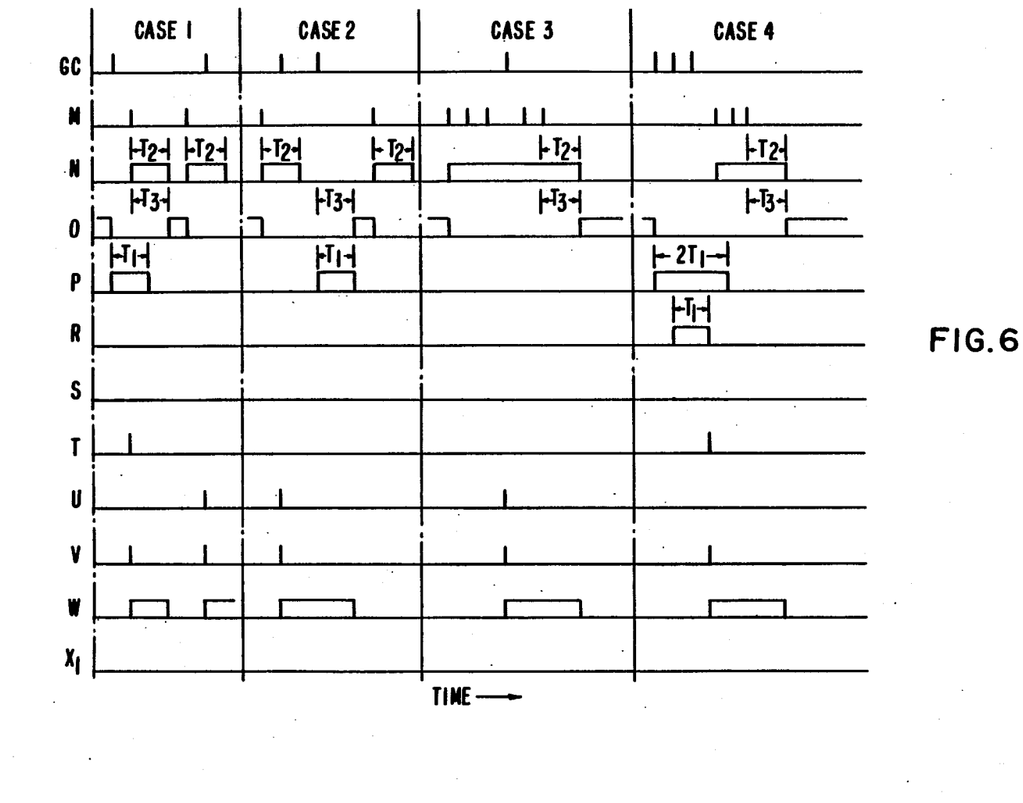

FIG. 6 is intended to show security against undesired trips incorporated into the trip logic circuit 52. Refer also to FIG 3 to better understand the FIG. 6 timing diagrams.

In case 1 of FIG. 6, a guard crossing pulse occurs setting the retriggerable timer $T_{1,ODD}$ high; therefore signal P goes high, and signal O goes low. A correct frequency pulse then occurs causing signals N, T, and V to go high. When signal V goes high, the memory 74 is set and signal W goes high. The leading edge of signal M resets the retriggerable timer $T_3$ such that signal O remains low for a period $T_3$. At the end of the period $T_3$, signal O goes high since neither a correct frequency pulse nor a guard crossing pulse has occurred during the interval $T_3$. When signal O goes high, the memory 74 is reset and signal W goes low. Another correct frequency pulse occurs setting signal N high. A second guard crossing pulse occurs while signal N is high causing the second guard crossing pulse to be memorized in the memory 74 as a first valid guard crossing pulse; no trip occurs. Case 1 illustrates the use of signal O to discard valid guard crossings held for longer than $T_3$ when no other guard crossing or correct frequency pulses occur during the interval $T_3$.

In case 2, a correct frequency pulse (M) occurs setting signal N high for a period $T_2$. The leading edge of the correct frequency pulse also causes signal O to go low. While signal N is high, a guard crossing pulse occurs. The guard crossing pulse causes signals U, V, and W to go high. Of course, signal W remains high until the memory 74 is reset. After signal N has gone low, a second guard crossing pulse occurs. The second guard crossing pulse triggers the retriggerable timer $T_{1,ODD}$ causing signal P to go high. The second guard crossing pulse also retriggers the retriggerable timer $T_3$ causing signal O to remain low for a period $T_3$. At the end of the time $T_3$, the signal O goes high resetting the memory 74 and causing signal W to go low. A second correct frequency pulse occurs after signal P has gone low. The second correct frequency pulse causes signal N to go high and signal O to go low. Again, case 2 illustrates use of the retriggerable timer $T_3$ to discard valid guard crossing pulses held longer than $T_3$ during which no other guard crossing or correct frequency pulses have occurred.

In case 3, three correct frequency pulses occur setting the retriggerable timer $T_2$ high and, of course, causing signal N to go to a high state. The leading edge of signal M causes signal O to go to a low state. A guard crossing pulse occurs while signal N is high. This causes signals U, V, and W to go high. Signal W remains high until the memory 74 is reset. While signal N is high, the output terminal $\overline{Q}$ of the retriggerable timer $T_2$ is low thereby disabling the AND gate 58. The guard crossing pulse is therefore blocked from the alternate guard signal crossing identifier 60 and subsequent correct frequency pulses cannot create a valid guard crossing pulse. Therefore signal $X_1$ does not go high. Case 3 illustrates the function of the AND gate 58 to prevent multiple counting of one valid guard crossing pulse.

In case 4, three guard crossing pulses occur while signal N is low. The first guard crossing pulse triggers the retriggerable timer $T_{1,ODD}$ and the third guard crossing pulse retriggers the retriggerable timer $T_{1,ODD}$. The second guard crossing pulse triggers the retriggerable timer $T_{1,EVEN}$. Therefore, after the third guard crossing pulse, signals P and R are high. Three correct frequency pulses then occur, but only the first correct frequency pulse occurs when signal P is high. The first correct frequency pulse causes signals T, V, and W to go high because a guard crossing pulse occurred within a fixed time $T_1$ before a correct frequency pulse. Since this condition is not satisfied for the second and third correct frequency pulses, the second and third correct frequency pulses do not produce a valid guard crossing signal to be memorized in the memory 74. Since only one valid guard crossing pulse was memorized by the memory 74, the signal $X_1$ does not go high. The memory 74 is reset when signal O goes high at a time $T_3$ after the third correct frequency pulse. This case illustrates use of the retriggerable timers $T_{1,ODD}$ and $T_{1,EVEN}$ to establish limits on the length of time the correct frequency or the guard crossing pulses are held and evaluated.

Circuit implementation for the elements of the subsynchronous-oscillations protective relay 4, as disclosed in FIGS. 1–3, is straightforward and well known in the art. However, the retriggerable timers $T_{1,ODD}$, $T_{1,EVEN}$, $T_2$ and $T_3$ exhibit several novel features and will therefore now be disclosed in detail. The retriggerable timer $T_{1,ODD}$ is shown in detail in FIG. 7. Since all the retriggerable timers are essentially equivalent only the retriggerable timer $T_{1,ODD}$ is discussed in detail.

Figure 7:
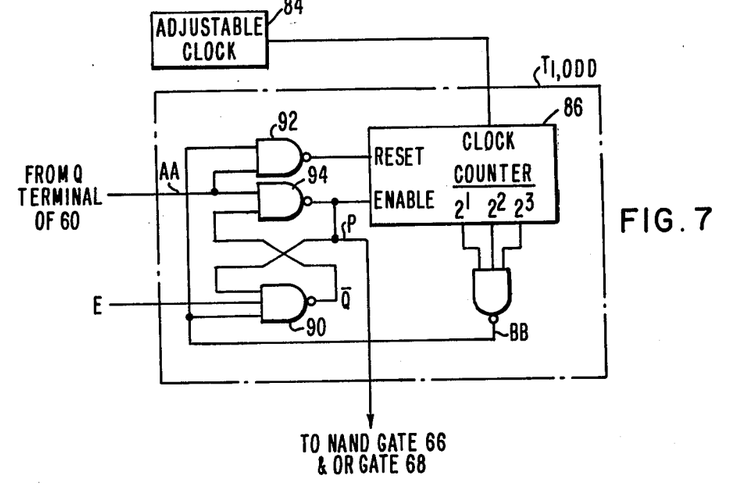
FIG. 7 is a schematic diagram for implementing the timers shown in FIG. 3.

In FIG. 7, there is shown a counter 86 having a reset input terminal, an enable input terminal, and a clock input terminal. The clock input terminal is responsive to the adjustable clock 84, which was discussed in detail in conjunction with FIG. 3. A first terminal of a NAND gate 88 is responsive to a $2^1$ output terminal of the counter 86; a second input terminal of the NAND gate 88 is responsive to a $2^2$ output terminal of the counter 86; a third input terminal of the NAND gate 88 is responsive to a $2^3$ output terminal of the counter 86. The NAND gate 88 produces a signal BB that is input to a first input terminal of a NAND gate 90 and a first input terminal of a NAND gate 92. The NAND gate 90 and a NAND gate 94 are connected to form an S-R flip-flop. An output terminal of the NAND gate 90 produces a signal $\overline{Q}$ that is input to a first input terminal of the NAND gate 94. Signal P, previously discussed in conjunction with FIG. 3, is provided at an output terminal of the NAND gate 94 and is input to a second input terminal of the NAND gate 90. The signal from the Q terminal of the alternate guard crossing signal identifier 60 is input to a second input terminal of the NAND gate 92 and a second input terminal of the NAND gate 94. Signal E, previously discussed in conjunction with FIG. 1, is input to a third input terminal of the NAND gate 90. In FIG. 7, the signal from the Q terminal of the alternate guard signal crossing identifier 60 (see FIG. 3) is designated AA. The reset input terminal of the counter 86 is connected to an output terminal of the NAND gate 92. The enable input terminal of the counter 86 is responsive to signal P.

When the retriggerable timer $T_{1,ODD}$ receives a pulse from the Q terminal of the alternate guard signal crossing identifier 60, signal P goes to a high state until the S-R flip-flop is reset. If a pulse from the Q terminal of the alternate guard signal crossing identifier 60 (designated signal AA in FIG. 7) occurs while signal P is in the high state, signal P continues in the high state.

Figure 8:
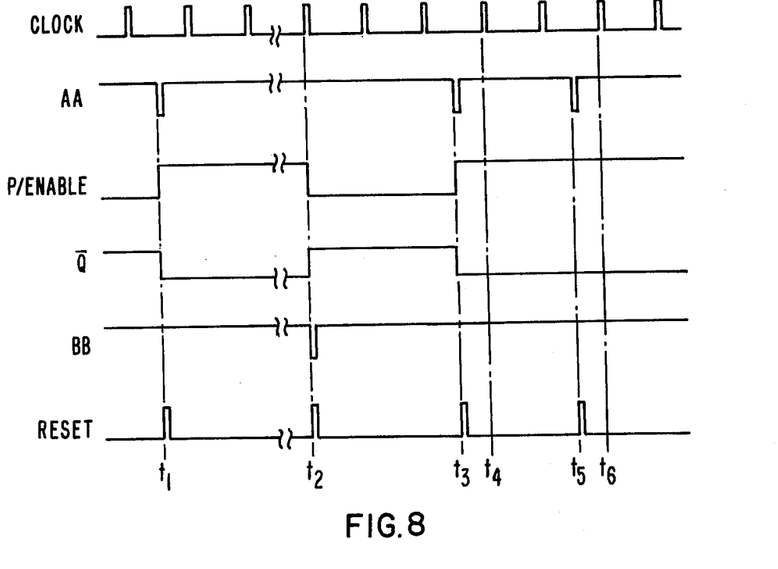
FIG. 8 is a timing diagram illustrating operation of the timer of FIG. 7.

Reference should now be made to the timing diagrams of FIG. 8 to provide a better understanding of the function of the retriggerable timer $T_{1,ODD}$. Note that the counter 86 receives clock pulses having a predetermined frequency from the adjustable clock 84. The clock pulses are counted by the counter 86 when the enable input terminal is high and the number of clock pulses counted is reflected by the state of the output terminals, (i.e., $2^1$, $2^2$, and $2^3$) of the counter 86. The initial conditions for the timing diagrams of FIG. 8 are a low state for signal P, a high state for signal $\overline{Q}$ and a high state for signal BB. Note since the NAND gates 90 and 94 are connected to form an S-R flip-flop, the output terminal of the NAND gate 94, where signal P is present, is actually a Q output terminal of the S-R flip-flop. As can be seen from the FIG. 8 timing diagrams, signal AA is normally in a high state; signal AA goes to a low state, for a short time, when an odd guard crossing pulse is identified by the alternate guard signal crossing identifier 60. When signal AA goes low at $t_1$, the S-R flip-flop is set, i.e., signal P goes high and signal $\overline{Q}$ goes low. Also, when signal AA goes low, the reset terminal of the counter 86 goes high thereby setting each of the output terminals $2^1$, $2^2$, and $2^3$, to a low state. Now the enable terminal of the counter 86 is high and the counter 86 begins to count the clock pulses from the adjustable clock 84.

At a time $t_2$, the thirteenth clock pulse occurs causing each of the output terminals $2^1$, $2^2$, and $2^3$ to go high and signal BB to go low. When signal BB goes low the S-R flip-flop is reset; signal $\overline{Q}$ goes high, and signal P goes low disabling the counter 86 from counting additional clock pulses. When signal BB goes low, the reset terminal of the counter 86 goes high and resets the counter 86 such that each of the output terminals $2^1$, $2^2$, and $2^3$ are in the low state. Signal BB then returns to the high state. Since the counter 86 is now disabled, additional clock pulses are not counted and signal P remains in the low state. See FIG. 8. Note that when signal E goes low at the end of an event, the counter 86 is disabled (i.e., when signal E goes low signal $\overline{Q}$ goes high, driving signal P high and disabling the counter 86).

The FIG. 8 timing diagrams will now be used to illustrate resetting of the retriggerable timer $T_{1,ODD}$ during the time signal P is in the high state. At time $t_3$, a negative-going pulse occurs in the signal AA. The counter 86 is reset and signal P goes high. The clock pulse occurring at $t_4$ is counted as the first clock pulse by the counter 86. Before the counter 86 reaches the point where each of the output terminals $2^1$, $2^2$, and $2^3$, is high, another negative-going pulse occurs in signal AA at $t_5$. The reset terminal again goes high and each of the output terminals $2^1$, $2^2$, and $2^3$ is set low. The counter 86 is therefore again in its initial state and the clock pulse occurring at $t_6$ is counted as the first clock pulse. As explained above, when the thirteenth clock pulse occurs, signal P goes low and the counter 86 is reset.

Use of the adjustable clock 84 in conjunction with a digital counter, such as the counter 86, in each of the retriggerable timers $T_{1,ODD}$, $T_{1,EVEN}$, $T_2$, and $T_3$ provides accurate and simultaneous adjustment of the interval during which the retriggerable timer output is high. This adjustment is made by simply changing the period of the clock pulses produced by the adjustable clock 84. It would be difficult to adjust each of the retriggerable timers $T_{1,ODD}$, $T_{1,EVEN}$, $T_2$ and $T_3$ to the same timing interval if each had a separate adjustment.

Having now discussed the sub-synchronous-oscillations protective relay 4 in detail, the advantages and novel features over the prior art can be more easily understood.

a. The use of the even and odd zero crossing frequency-determining concept, implemented by the even frequency detector 46 and the odd frequency detector 48 and the elements associated therewith, to enhance the overall frequency detection sensitivity.

b. The intentional time delay before signal F begins to decay, designed to cope with 60 Hz fault transients to enhance the security of the sub-synchronous-oscillations protective relay 4.

c. The exponential decay of signal F, permitting easier and more meaningful correlation between the sub-synchronous oscillations protective relay 4 and the response of the turbine-generator to sub-synchronous oscillations.

d. The logic conditions necessary to produce signal $X_1$ and implementation of these conditions in the trip logic circuit 52.

e. The use of two timer circuits (i.e., the retriggerable timers $T_{1,EVEN}$ and $T_{1,ODD}$) to monitor the guard crossings thereby permitting separate and accurate identification of multiple guard-crossing occurrences under all conditions.

f. The use of the timer circuits to implement the desired trip logic in the trip logic circuit 52.

g. The shared adjustable time base (i.e. the adjustable clock 84) for the trip logic circuit 52.

h. The frequency determining scheme in which the frequency is converted to a ramp function whose value is sampled at the conclusion of each frequency cycle to determine the correctness of the frequency.

What is claimed is:

1. A protective relay for protecting a power system from sub-synchronous current oscillations, said protective relay comprising:

first circuit means being adapted for coupling to the power system for producing a sub-synchronous signal representative of the sub-synchronous current therein;

means for producing a reference signal;

second circuit means for determining the amplitude of said sub-synchronous signal and for producing a guard-crossing pulse when said sub-synchronous signal exceeds said reference signal;

third circuit means for determining the frequency of said sub-synchronous signal and for producing a correct frequency pulse when the frequency of said sub-synchronous signal is within a predetermined frequency range;

fourth circuit means responsive to said guard-crossing pulse and said correct frequency pulse for producing a first trip signal when a predetermined logic relationship exists between said guard-crossing pulse and said correct frequency pulse.

2. The protective relay of claim 1 including:

means for producing a predetermined threshold; and fifth circuit means responsive to said sub-synchronous signal for producing a second trip signal when the amplitude of said sub-synchronous signal exceeds said predetermined threshold.

3. The protective relay of claim 1 wherein the second circuit means includes:

full-wave rectifier means for producing a rectified sub-synchronous signal in response to said sub-synchronous signal;

means for producing a predetermined threshold;

first comparator means for producing a comparison pulse whenever said rectified sub-synchronous signal exceeds said predetermined threshold, wherein the duration of said comparison pulse is equal to the time during which said rectified sub-synchronous signal exceeds said predetermined threshold;

window circuit means for producing a window pulse whenever said window circuit means senses the leading edge of said comparison pulse, wherein said window pulse has a predetermined duration and is retriggered by the leading edge of said comparison pulse;

inhibit circuit means for producing an inhibit pulse whenever said inhibit circuit means senses the leading edge of said window pulse, wherein said inhibit pulse has a predetermined duration and is retriggered by the leading edge of said window pulse;

inverter means responsive to said inhibit pulse for producing an inverted inhibit pulse;

first AND gate means responsive to said window pulse and said inverted inhibit pulse for producing a control pulse;

signal generator means for producing the reference signal in response to said control pulse; and second comparator means responsive to said rectified sub-synchronous signal and the reference signal for producing the guard-crossing pulse when said rectified sub-synchronous signal exceeds the reference signal.

4. The protective relay of claim 3 wherein the said predetermined threshold is 0.16 p.u.

5. The protective relay of claim 3 wherein the predetermined duration of the window pulse is 60 ms.

6. The protective relay of claim 3 wherein the predetermined duration of the inhibit pulse is 100 ms.

7. The protective relay of claim 3 wherein the reference signal begins to exponentially decay, from an initial value, when the signal generator means senses the leading edge of the control pulse, and wherein the reference signal is reset to said initial value when the signal generator means senses the trailing edge of the control pulse.

8. The protective relay of claim 3 wherein the fourth circuit means includes:

first timer means responsive to the correct frequency pulse, said first timer means for producing a first timing pulse at a first output terminal thereof beginning at the leading edge of the correct frequency pulse and having a duration of $T_1$, and for producing an inverted first timing pulse at a second output terminal thereof, said inverted first timing pulse having an inverse relationship to said first timing pulse, and wherein the leading edge of the correct frequency pulse retriggers said first timer means;

second AND gate means responsive to the guard-crossing pulse and said inverted first timing pulse for producing a first output pulse when the guard-crossing pulse and said inverted timing pulse occur simultaneously;

first counter means for counting each said first output pulse and for producing an even-count pulse at a first output terminal thereof when said count is even and for producing an odd-count pulse at a second output terminal thereof when said count is odd;

second timer responsive to said even-count pulse for producing a second timing pulse beginning at the leading edge of said even-count pulse and having a duration of $T_2$, wherein the leading edge of said even-count pulse retriggers said second timer means;

third timer means responsive to said odd-count pulse for producing a third timing pulse beginning at the leading edge of said odd-count pulse and having a duration of $T_2$, wherein the leading edge of said odd-count pulse retriggers said third timer means;

first OR gate means responsive to said second and third timing pulses for producing a fourth timing pulse;

means for producing a leading edge pulse at the leading edge of said first timing pulse;

third AND gate means responsive to said fourth timing pulse and said leading edge pulse for producing a second output pulse;

fourth AND gate means responsive to the guard-crossing pulse and said first timing pulse for producing a third output pulse;

second OR gate means responsive to said second and third output pulses for producing a fourth output pulse;

logic means for logically relating the guard-crossing pulse, the frequency detection pulse, and the control pulse and for producing a reset pulse;

memory means having a first input terminal responsive to said fourth output pulse for producing a memory pulse in response thereto, said memory pulse beginning at the leading edge of said fourth output pulse and continuing until said reset pulse is received by said memory means at a second input terminal thereof;

fifth AND gate means responsive to said fourth output pulse and said memory pulse for producing a fifth output pulse;

sixth AND gate means responsive to said leading edge pulse and said second and third timing pulses for producing a sixth output pulse; and third OR gate means responsive to said fifth and sixth output pulses for producing the first trip signal;

9. The protective relay of claim 8 wherein the logic means includes:

fourth OR gate means responsive to the correct frequency pulse, the guard-crossing pulse, and the control pulse for producing a seventh output pulse;

fourth timer means for producing a fourth timing pulse at a first output terminal thereof, said fourth timing pulse beginning at the leading edge of the seventh output pulse and having a duration of $T_3$, and for producing an inverted fourth timing pulse at a second output terminal thereof, said inverted fourth timing pulse having an inverse relationship to said fourth timing pulse, and wherein the leading edge of the seventh output pulse retriggers said fourth timer means; and fifth OR gate means responsive to said inverted fourth timing pulse and the control pulse for producing the reset pulse.

10. The protective relay of claim 9 including a clock source for producing a clock signal for controlling the duration of the first, second, third, and fourth timing pulses.

11. The protective relay of claim 10 wherein the clock source produces clock pulses at a predetermined rate.

12. The protective relay of claim 11 wherein the first timer means includes:

second counter means responsive to the clock pulses for counting each of the clock pulses, said second counter means having a reset input terminal, an enable input terminal, and for producing a correct count pulse whenever the number of clock pulses reaches a predetermined limit;

first flip-flop means having a set input terminal responsive to the correct frequency pulse, and a reset input terminal responsive to said correct count pulse, said first flip-flop means for producing the first timing pulse at a Q output terminal thereof and for producing the inverted first timing pulse at a $\overline{Q}$ output terminal thereof;

first NAND gate means having a first input terminal responsive to said correct count pulse, a second input terminal responsive to the correct frequency pulse, and wherein said reset input terminal is responsive to said first NAND gate means.

13. The protective relay of claim 12 wherein the second timer means includes:

third counter means responsive to the clock pulses for counting each of the clock pulses, said third counter means having a reset input terminal, and enable input terminal, and for producing a correct count pulse whenever the number of clock pulses reaches a predetermined limit.

second flip-flop means having a set input terminal responsive to the even-count pulse, and a reset input terminal responsive to said correct count pulse, said second flip-flop means for producing the second timing pulse at a Q output terminal thereof;

second NAND gate means having a first input terminal responsive to said correct count pulse, a second input terminal responsive to the even-count pulse, and wherein said reset input terminal is reponsive to said second NAND gate means.

14. The protective relay of claim 13 wherein the third timer means includes:

fourth counter means responsive to the clock pulses for counting each of the clock pulses, said fourth counter means having a reset input terminal, an enable input terminal, and for producing a correct count pulse whenever the number of clock pulses reaches a predetermined limit;

third flip-flop means having a set input terminal responsive to the odd-count pulse, and a reset input terminal responsive to said correct count pulse, said third flip-flop means for producing the third timing pulse at a Q output terminal thereof;

third NAND gate means having a first input terminal responsive to said correct count pulse, a second input terminal responsive to the odd-count pulse and wherein said reset input terminal is responsive to said third NAND gate means.

15. The protective relay of claim 14 wherein the fourth timer means includes:

fifth counter means responsive to the clock pulses for counting each of the clock pulses, said fifth counter means having a reset input terminal, an enable input terminal, and for producing a correct count pulse whenever the number of clock pulses reaches a predetermined limit;

fourth flip-flop means having a set input terminal responsive to the seventh output pulse, and a reset input terminal responsive to said correct count pulse, said fourth flip-flop means for producing the fourth timing pulse at a Q output terminal thereof;

fourth NAND gate means having a first input terminal responsive to said correct count pulse, a second input terminal responsive to the seventh output pulse, and wherein said reset input terminal is responsive to said fourth NAND gate means.

16. The protective relay of claim 15 wherein the first counter means includes a fifth flip-flop means responsive to said first output pulse, said fifth flip-flop means for producing the even-count pulse at a Q output terminal thereof when the count is even, and for producing the odd count pulse at a $\overline{Q}$ output terminal thereof when said count is odd.

17. The protective relay of claim 1 wherein the third circuit means includes:

first detector means for producing a zero-crossing pulse whenever the sub-synchronous signal has zero amplitude;

second detector means responsive to said zero-crossing pulse for counting each said zero-crossing pulse and for producing an odd-frequency pulse when said count is odd;

third detector means responsive to said zero-crossing pulse for counting each said zero-crossing pulse and for producing an even-frequency pulse when said count is even;

first reset means responsive to said odd-frequency pulse for producing an odd-reset pulse at a predetermined time after said odd-frequency pulse;

second reset means responsive to said even-frequency pulse for producing an even-reset pulse at a predetermined time after said even-frequency pulse;

means for producing a first ramp signal having an amplitude increasing at a constant rate, wherein said first ramp signal is reset to zero amplitude by the leading edge of said odd-reset pulse;

means for producing a second ramp signal having an amplitude increasing at a constant rate, wherein said second ramp signal is reset to zero amplitude by the leading edge of said even-reset pulse;

means for producing an odd-correct frequency pulse when said first ramp signal reaches a predetermined amplitude;

means for producing an even-correct frequency pulse when said second ramp signal reaches a predetermined amplitude;

OR gate means responsive to said odd-correct frequency pulse and said even-correct frequency pulse for producing the correct frequency pulse.

18. A protective relay for protecting a power system from sub-synchronous current oscillations, said protective relay comprising:

first circuit means being adapted for coupling to the power system for producing a sub-synchronous signal representative of the sub-synchronous current therein;

full-wave rectifier means for producing a rectified sub-synchronous signal in response to said sub-synchronous signal;

means for producing a first predetermined threshold;

first comparator means for producing a comparison pulse whenever said rectified sub-synchronous signal exceeds said first predetermined threshold, wherein the duration of said comparison pulse is equal to the time during which said rectified sub-synchronous signal exceeds said first predetermined threshold;

window circuit means for producing a window pulse whenever said window circuit means senses the leading edge of said comparison pulse, wherein said window pulse has a 60 ms duration and is retriggered by the leading edge of said comparison pulse;

inhibit circuit means for producing an inhibit pulse whenever said inhibit circuit means senses the leading edge of said window pulse, wherein said inhibit pulse has a 100 ms duration and is retriggered by the leading edge of said window pulse;

inverter means responsive to said inhibit pulse for producing an inverted inhibit pulse;

first AND gate means responsive to said window pulse and said inverted inhibit pulse for producing a control pulse;

signal generator means for producing a reference signal in response to said control pulse;

second comparator means responsive to said rectified sub-synchronous signal and said reference signal for producing a guard-crossing pulse when said rectified sub-synchronous signal exceeds said reference signal;

first detector means responsive to said rectified sub-synchronous signal for producing a zero-crossing pulse whenever said rectified sub-synchronous signal has zero amplitude;

second detector means responsive to said zero-crossing pulse for counting each said zero-crossing pulse and for producing an odd-frequency pulse when said count is odd;

third detector means responsive to said zero-crossing pulse for counting each said zero-crossing pulse and for producing an even-frequency pulse when said count is even;

first reset means responsive to said odd-frequency pulse for producing an odd-reset pulse at a predetermined time after said odd-frequency pulse;

second reset means responsive to said even-frequency pulse for producing an even-reset pulse at a predetermined time after said even-frequency pulse;

means for producing a first ramp signal having an amplitude increasing at a constant rate, wherein said first ramp signal is reset to zero amplitude by the leading edge of said odd-reset pulse;

means for producing a second ramp signal having an amplitude increasing at a constant rate, wherein said second ramp signal is reset to zero amplitude by the leading edge of said even-reset pulse;

means for producing an odd-correct frequency pulse when said first ramp signal reaches a predetermined amplitude;

means for producing an even-correct frequency pulse when said second ramp signal reaches a predetermined amplitude;

first OR gate means responsive to said odd-correct frequency pulse and said even-correct frequency pulse for producing a correct frequency pulse;

first timer means responsive to said correct frequency pulse, said first timer means for producing a first timing pulse at a first output terminal thereof beginning at the leading edge of said correct frequency pulse and having a duration of $T_1$, and for producing an inverted first timing pulse at a second output terminal thereof, said inverted first timing pulse having an inverse relationship to first timing pulse;

second AND gate means responsive to said guard-crossing pulse and said inverted first timing pulse for producing a first output pulse when said guard-crossing pulse and said inverted timing pulse occur simultaneously;

counter means for counting each said first output pulse and for producing an even-count pulse at a first output terminal thereof when said count is even and for producing an odd-count pulse at a second output terminal thereof when said count is odd;

second timer means responsive to said even-count pulse for producing a second timing pulse beginning at the leading edge of said even-count pulse and having a duration of $T_2$, wherein the leading edge of said even-count pulse retriggers said second timer means;

third timer means resonsive to said odd-count pulse for producing a third timing pulse beginning at the leading edge of said odd-count pulse and having a duration of $T_2$, wherein the leading edge of said odd-count pulse retriggers said third timer means;

second OR gate means responsive to said second and third timing pulses for producing a fourth timing pulse;

means for producing a leading edge pulse at the leading edge of said first timing pulse;

third AND gate means responsive to said fourth timing pulse and said leading edge pulse for producing a second output pulse;

fourth AND gate means responsive to said guard-crossing pulse and said first timing pulse for producing a third output pulse;

third OR gate means responsive to said second and third output pulses for producing a fourth output pulse;

fourth OR gate means responsive to said correct frequency pulse, said guard-crossing pulse, and said control pulse for producing a fifth output pulse;

fourth timer means for producing a fouth timing pulse at a first output terminal thereof, said fourth timing pulse beginning at the leading edge of said fifth output pulse and having a duration of $T_3$, and for producing an inverted fourth timing pulse at a second output terminal thereof, said inverted fourth timing pulse having an inverse relationship to said fourth timing pulse;

fifth OR gate means responsive to said inverted fourth timing pulse and said control pulse for producing a reset pulse;

memory means having a first input terminal responsive to said fourth output pulse for producing a memory pulse in response thereto, said memory pulse beginning at the leading edge of said fourth output pulse and continuing until said reset pulse is received by said memory means at a second input terminal thereof;

fifth AND gate means responsive to said fourth output pulse and said memory pulse for producing a sixth output pulse;

sixth AND gate means responsive to said leading edge pulse and said second and third timing pulses for producing a seventh output pulse;

sixth OR gate means responsive to said sixth and seventh output pulses for producing a first trip signal;

means for producing a second predetermined threshold; and means responsive to said sub-synchronous signal for producing a second trip signal when the amplitude of said sub-synchronous signal exceeds said second predetermined threshold.

* * * * *